United States Patent
Rube

[15] 3,644,028
[45] Feb. 22, 1972

[54] SLIDE CHANGER MECHANISM FOR SLIDE PROJECTORS

[72] Inventor: Helmut Rube, Endersbach, Germany
[73] Assignee: Robert Bosch Photokino GmbH, Stuttgart-Unterturkheim, Germany
[22] Filed: Feb. 17, 1969
[21] Appl. No.: 799,558

[30] Foreign Application Priority Data

Feb. 17, 1968  Germany......................P 16 22 087.4

[52] U.S. Cl...................................353/103, 64/30, 74/50, 353/114
[51] Int. Cl..................G03b 23/02, F16d 7/02, F16h 21/18
[58] Field of Search..................353/103, 114, 115, 116, 117, 353/118; 74/50; 64/28, 29, 30

[56] References Cited

UNITED STATES PATENTS

| | | | |
|---|---|---|---|
| 3,218,922 | 11/1965 | Mahoney | 353/105 |
| 2,949,814 | 8/1960 | Boughton et al. | 353/92 |
| 2,979,987 | 4/1961 | Brumley et al. | 353/116 |

*Primary Examiner*—Leonard Forman
*Assistant Examiner*—Steven L. Stephan
*Attorney*—Michael S. Striker

[57] ABSTRACT

Slides in a slide projector are movable from their tray to projection position and vice versa by a reciprocable carriage which is driven by an electric motor through the intermediary of a friction clutch when it transports slides back into the tray and through the intermediary of the friction clutch and a second clutch, which latter can transmit a weaker force than the friction clutch, when the slides are moved from the tray to projection position so that a slide which jams during movement toward projection position can be returned to the tray because the carriage is driven with a greater force when it moves slides back into the tray.

8 Claims, 2 Drawing Figures

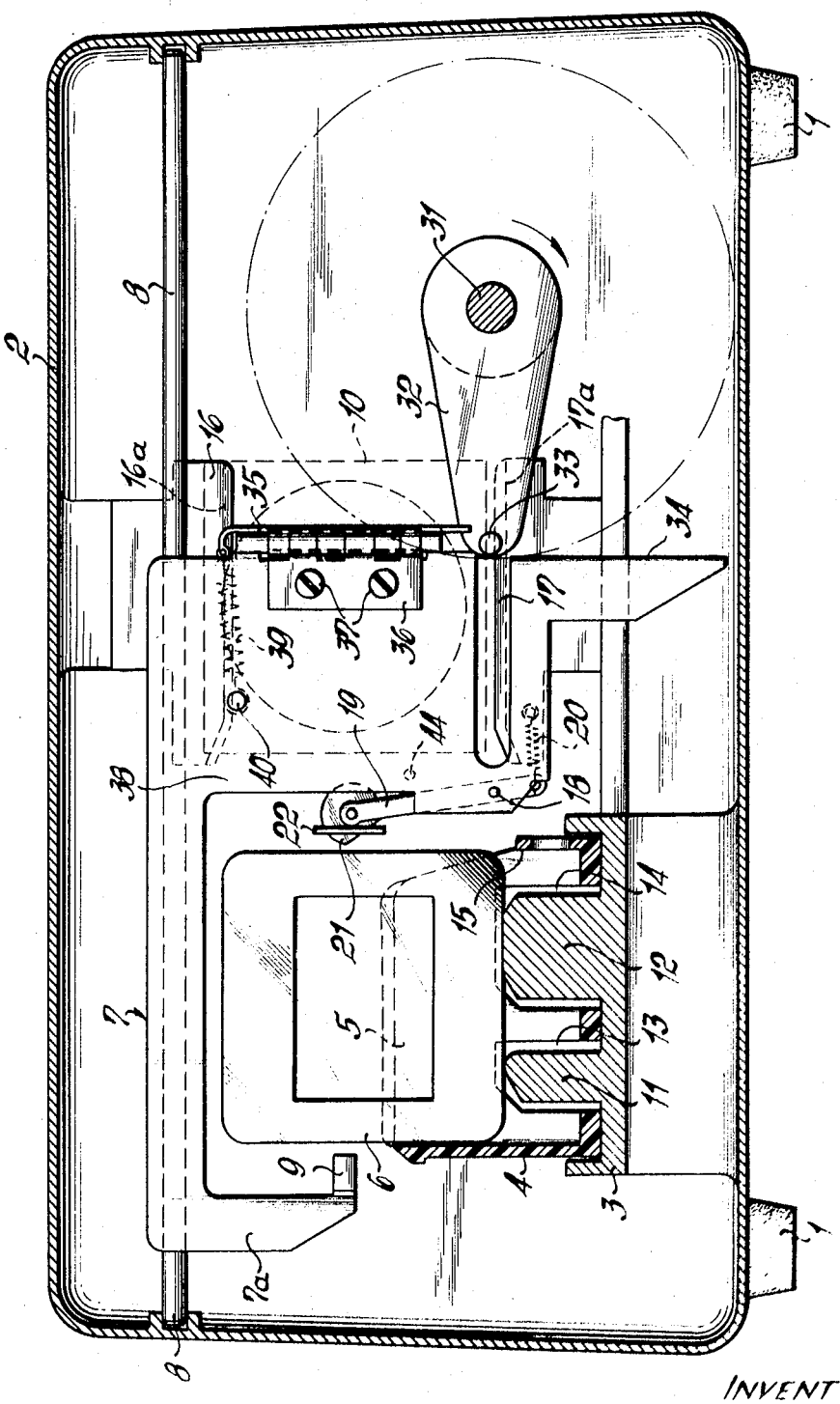

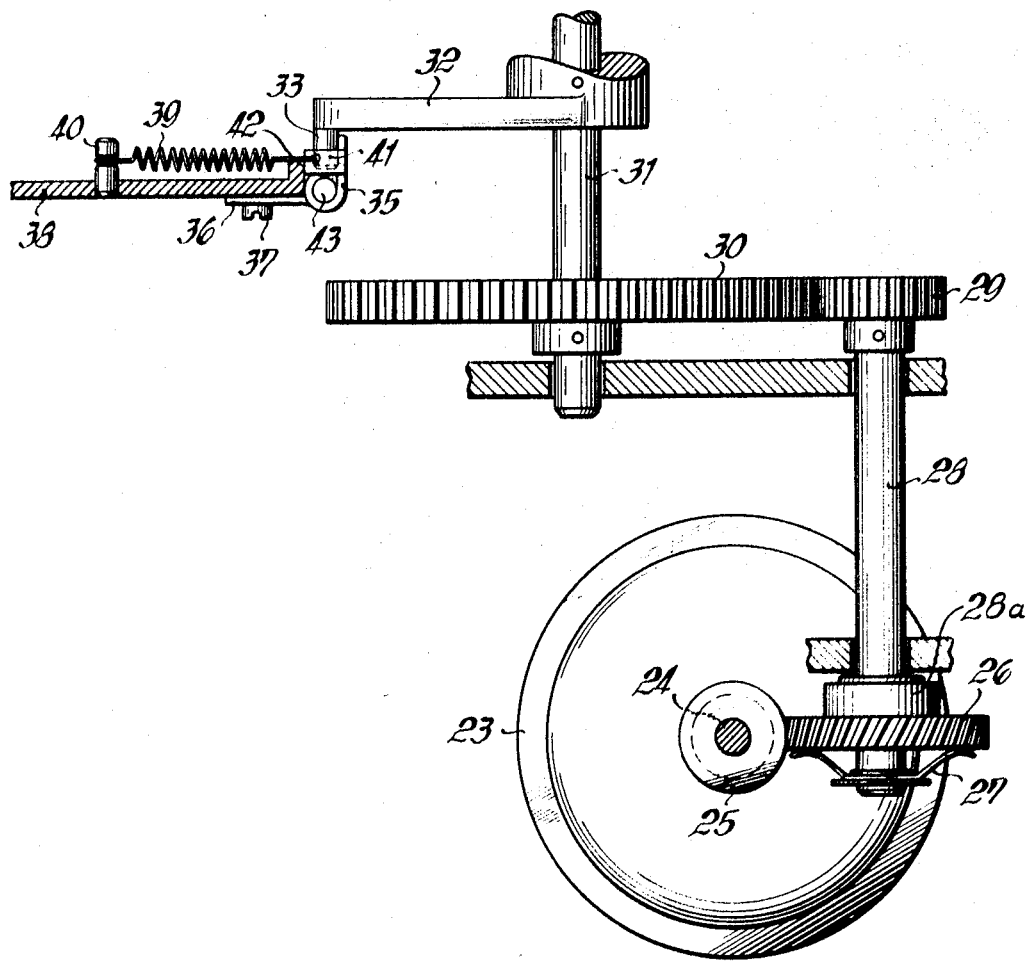

SLIDE CHANGER MECHANISM FOR SLIDE PROJECTORS

BACKGROUND OF THE INVENTION

The present invention relates to slide projectors in general, and more particularly to improvements in slide changer mechanisms for slide projectors. Still more particularly, the invention relates to improvements in slide changer mechanisms which are preferably powered by an electric motor or another suitable prime mover.

It is already known to provide a slide projector with an automatic slide changer mechanism which can move successive or selected slides from a circular or straight tray into projection position and back into the corresponding compartments of the tray. As a rule, the slide changer mechanism comprises a pair of arms one of which pushes a slide from its compartment to projection position and the other of which pushes the slide from projection position back to its compartment. Problems arise when a slide offers or encounters excessive opposition to movement from or back into its compartment. This can happen if the frame of a slide is deformed or damaged as well as when particles of foreign matter penetrate into the path of movement of slides between the projection position and their compartments. It also happens from time to time that the frame of a slide is too thick or that it has a manufacturing defect (such as one or more beads, ribs or the like) which prevents it from advancing in grooves or analogous guide means provided in the slide projector housing to control movements of slides between their compartments and a position of registry with the optical system. It was found that a slide is more likely to jam during transfer toward projection position, i.e., during withdrawal from its compartment. This is readily understandable since the slide should be able to move back into its compartment if it was capable of moving from such compartment to projection position.

Many presently known slide projectors are provided with a safety device which insures that the motor which drives the slide-engaging parts of the slide changer mechanism can continue its operation even if a slide becomes stuck during movement between its compartment and projection position. Such safety devices normally comprise friction couplings. It is also known to employ safety devices which comprise a yieldable detent mechanism between two arms or levers of the slide changer mechanism. The detent mechanism yields when one of the arms encounters excessive opposition during transport of a slide toward or away from the tray. Reference may be had to German Pat. No. 1,221,033. A drawback of such safety devices is that the slide changer mechanism is unable to return a slide, which has become stuck on its way between the tray and projection position, back into the respective compartment of the tray. Consequently, the projection of images must be interrupted and the operator must open the projector housing or otherwise gain access to the slide which is thereupon removed by hand. Removal of jammed slides is especially difficult if the slide changer mechanism is designed to be operated exclusively by a motor, i.e., if the mechanism is not equipped with manually operated actuating means.

SUMMARY OF THE INVENTION

It is an object of my invention to provide a novel and improved slide projector wherein the slide changer mechanism is designed in such a way that it is not damaged if a slide jams during transport between its tray and projection position and which is capable of automatically returning such slide into its compartment without necessitating any intervention on the part of the operator.

Another object of the invention is to provide an improved power-operated slide changer mechanism wherein the connection between the prime mover and the slide-engaging parts is constructed and assembled in a novel way.

A further object of the invention is to provide a slide changer mechanism of the just outlined character which need not occupy more room than presently known mechanisms and which can automatically remove a jammed slide.

An additional object of the invention is to provide novel and improved safety means for use in a slide changer mechanism.

My invention is embodied in a slide projector which comprises a housing or an analogous support, a container (for example, a straight or circular tray) which is movably carried by the support and is arranged to accommodate a supply of diapositives or slides each of which is movable by the container to a predetermined transfer position, and a slide changer mechanism which is also carried by the support and includes a reciprocable carriage or an analogous slide engaging device movable from a first position in which it is ready to engage a slide in transfer position to a second position to thereby transport the slide from transfer position to a projection position of registry with the optical system of the slide projector, and vice versa, an electric motor or an analogous prime mover, and a novel motion transmitting connection between the slide engaging device and the prime mover. The motion transmitting connection comprises means for transporting the slide engaging device from second to first position with a first force and for transporting the slide engaging device from first to second position with a second force which is weaker than the first force.

The motion transmitting connection preferably comprises a friction coupling which is effective during transport of the slide engaging device in either direction and a second coupling in series with the friction coupling and effective only when the slide engaging device is transported from first to second position. The predetermined force which can be transmitted by the friction coupling is greater than the predetermined force which can be transmitted by the second coupling.

The novel features which are considered as characteristic of the invention are set forth in particular in the appended claims. The improved slide changer mechanism itself, however, both as to its construction and its mode operation, together with additional features and advantages thereof, will be best understood upon perusal of the following detailed description of certain specific embodiments with reference to the accompanying drawing.

BRIEF DESCRIPTION OF THE DRAWING

FIG. 1 is a transverse vertical sectional view of a slide projector which comprises a slide changer mechanism embodying one form of my invention; and FIG. 2 is a plan view of the slide changer mechanism.

DESCRIPTION OF THE PREFERRED EMBODIMENTS

Referring first to FIG. 1, there is shown a slide projector which comprises a housing or support 2 provided with several legs 1 and having a horizontal channel 3 which is adjacent to one sidewall and registers with openings provided in the front and rear walls of the housing. The channel 3 serves as a guide for an elongated straight container or tray 4 which accommodates a supply of slides 6 each located in a vertical plane extending at right angles to the longitudinal direction of the channel 3. The tray 4 is preferably introduced at the rear end and is moved stepwise toward and through the forward end of the channel 3 in a manner well known from the art and not forming part of the present invention. This tray is formed with transversely extending partitions 5 defining between themselves narrow compartments each of which can accommodate a slide 6.

The bottom wall of the channel 3 is provided with two forwardly and upwardly sloping ramps or lifting means 11, 12 which extend into complementary cutouts 13, 14 provided therefor in the bottom wall of the tray 4. These ramps serve to gradually lift successive slides 6 to a predetermined level so that the lower edges of frames of such slides are held at a level at least slightly above the right-hand side wall 15 of the tray 4. This enables the slide changer mechanism to transport successive (or selected) slides 6 from a predetermined transfer position (occupied by the slide 6 shown in FIG. 1) to a projection position in registry with a projection window 10 of the projector and back to transfer position. Such transport of a slide 6 normally takes place during each interval between successive stepwise advances of the tray 4 along the channel 3.

The slide changer mechanism comprises a slide engaging device 7 (hereinafter called carriage for short) which is reciprocable along a transversely extending guide rod 8 mounted in the housing 2 at a level above the projection window 10 and channel 3. The carriage 7 is provided with a downwardly extending arm or extension 7a at its left-hand end (as viewed in FIG. 1) and this arm has a projection 9 which can engage the edge of the frame on that slide 6 which assumes the aforementioned transfer position on the top faces of the ramps 11 and 12. FIG. 1 shows the carriage 7 in its left-hand or first end position in which the projection 9 is closely adjacent to but still somewhat spaced from the left-hand edge of frame on the adjoining slide 6.

The housing 2 further accommodates two rigidly or substantially rigidly mounted guide rails 16, 17 which are respectively installed at a level above and below the projection window 10 and have horizontal grooves 16a, 17a which can receive and guide the upper and lower edges on the frame of that slide 6 which is pushed by the projection 9 toward the projection position, namely, into registry with the window 10. The cross sections of the grooves 16a, 17a are preferably of polygonal outline and the width of these grooves is such that they insure proper positioning of slides in a plane which is exactly normal to the optical axis of the projection lens system in the housing 2.

The carriage 7 is provided with a second extension or arm 19 which is a two-armed lever pivotally secured to the main portion of the carriage by a horizontal pin 18 and biased in a counterclockwise direction, as viewed in FIG. 1, by a helical contraction spring 20 which operates between its lower arm and a post on the main portion of the carriage. The upper arm of the lever 19 is provided with a slide-engaging portion 21 (for example, an idler roller which is preferably formed with a flat facet); the purpose of the portion 21 is to push a slide 6 back from the projection position to transfer position (i.e., back into the corresponding compartment of the tray 4) when the carriage 7 is caused to travel toward the left-hand end position shown in FIG. 1. When the carriage 7 begins to move away from the left-hand end position of FIG. 1, the projection 9 shifts the slide 6 from transfer position toward the projection window 10 whereby the right-hand edge of the frame on such slide engages the portion 21 on the upper arm of the lever 19. In order to prevent the portion 21 from interfering with lengthwise movement of the tray 4 in forward or rearward direction, the housing 2 accommodates a fixed stop 22 which engages the upper arm of the lever 19 and prevents the portion 21 from extending into the path of movement of slides which are properly accommodated in the tray 4.

The slide changer mechanism further comprises a prime mover 23, preferably an electric motor which is shown in FIG. 2 and is installed in or on the housing 2. The output shaft 24 of this motor is arranged to rotate in a single direction and carries a worm 25 in mesh with a worm wheel 26 on an intermediate shaft 28. The shaft 28 has a collar or flange 28a and the worm wheel 26 is biased against one end face of this flange by a dished spring 27. Thus, the parts 26, 27, 28a constitute a friction coupling which can transmit a predetermined torque from the shaft 24 to the shaft 28. This friction coupling forms part of the motion transmitting connection between the motor 23 and the carriage 7. If a slide 6 jams on its way toward or away from projection position, the output shaft 24 of the motor 23 can rotate with reference to the intermediate shaft 28 because the worm wheel 26 then simply rotates with reference to the flange 28a.

The motion transmitting connection between the output shaft 24 of the motor 23 and the carriage 7 further comprises a gear reducer including a small gear 29 which is rigidly secured to the intermediate shaft 28 and meshes with a larger gear 30 on a crankshaft 31. The shaft 31 is rigid with a radially extending crank arm 32 which carries a coupling element here shown as a shifter pin 33. As best shown in FIG. 1, the shifter pin 33 cooperates with a vertical edge face 34 on the main body portion of the carriage 7 in order to move the carriage toward the left-hand end position of FIG. 1, and with a vertical face of a second coupling element or leaf 35 which is pivotally secured to the carriage 7 by a vertical pintle 43. The crank arm 32 is rotated in a clockwise direction, as viewed in FIG. 1, and its shifter pin 33 engages the edge face 34 at or close to the 6 o'-clock position of the crank arm. The pin 33 then moves the carriage 7 in a direction to the left toward the end position of FIG. 1. As the crank arm 32 continues to turn in a clockwise direction, the pin 33 engages the face of the leaf 35 and begins to move the carriage 7 in a direction to the right so that the projection 9 entrains a slide 6 which rests in transfer position on the ramps 11, 12 and transports such slide into the grooves 16a, 17a and toward the projection position, namely, into registry with the window 10. The pin 33 leaves the leaf 35 after an angular displacement through an angle of up to 180° i.e., in the 6 o'clock position of the crank arm 32 and thereupon engages the edge face 34 and begins to move the carriage 7 back toward the position shown in FIG. 1. The portion 21 of the lever 19 then pushes the slide from projection position back into the corresponding compartment of the tray 4.

As shown in FIG. 2, the leaf 35 is biased in a counterclockwise direction by a helical spring 39 one end of which is affixed to a post 40 on the carriage 7. The bias of the spring 39 is selected in such a way that the leaf 35 can yield to pressure of the shifter pin 33 if a slide which is engaged by the projection 9 encounters an obstruction during or prior to movement from transfer position toward projection position. In the illustrated embodiment, the leaf 35 forms part of a hinge having a second leaf 36 which is screwed, bolted or otherwise secured to the carriage 7, as at 37. FIG. 2 shows that the second leaf 36 is secured to a platelike portion 38 of the carriage 7. The right-hand end of the aforementioned helical spring 39 is coupled to a post 41 on the leaf 35. When the carriage 7 offers normal resistance to movement of the leaf 35 with the shifter pin 33, the leaf 35 bears against a suitable abutment 42 on the platelike portion 38.

The parts 33, 35, 39 together constitute a second coupling of the motion transmitting connection between the motor 23 and carriage 7. This second coupling is effective only when the carriage 7 tends to move or moves a slide 6 from transfer position toward projection position. The force which is needed to overcome the bias of the spring 39 is substantially weaker than the force which is required to overcome the bias of the spring 27 in the aforementioned friction coupling between the shafts 24 and 28 of the motion transmitting connection. For example, the force needed to stretch the spring 39 is only half the force needed to permit rotation of the worm wheel 26 with reference to the intermediate shaft 28. Otherwise stated, the motion transmitting connection between the motor 23 and carriage 7 is weaker when the carriage is to move from the left-hand end position of FIG. 1 and substantially stronger when the carriage is to move toward such left-hand end position.

The Operation

When the circuit of the motor 23 is open, the crank arm 32 assumes the position shown in FIG. 1 so that the carriage 7 is held in the left-hand end position. This enables the operator to insert a fresh tray 4 with a supply of slides 6 so that the foremost slide or a selected slide assumes the projection position in which its frame is in registry with and in the space between the projection 9 of the arm 7a and portion 21 of the lever 19. The operator then completes the motor circuit, for example, by depressing a knob (not shown) whereby the friction coupling 26, 27, 28a rotates the intermediate shaft 28 and the reducer 29, 30 rotates the crankshaft 31 in a clockwise direction, as viewed in FIG. 1. The shifter pin 33 engages the leaf 35 and moves the carriage 7 toward the right-hand end position whereby the projection 9 pushes the slide 6 from transfer position into the grooves 16a, 17a and toward the projection position. The slide which registers with the projection 9 is held in raised position by the ramps 11, 12 so that it can clear the right-hand sidewall 15 of the tray 4. The shifter pin 33 leaves the leaf 35 after an angular displacement through an oblique angle (preferably not more than 180°). The crank arm 32 then opens the motor circuit by means not shown, so that the motor 23 comes to a halt in a position, when the image of a slide 6 in the window 10 is being projected onto a screen or the like. If the operator then decides to project the image of the next slide, he starts the motor 23 anew so that the crank arm 32 continues its movement and the pin 33 engages the edge face 34 to initiate movement of the carriage 7 toward the left-hand end position. The projected slide 6 is thereby pushed by the portion 21 of the lever 19 and returned onto the ramps 11, 12 to reoccupy its compartment in the tray 4. The portion 21 is automatically arrested when the upper arm of the lever 19 reaches the stop 22. The carriage 7 is then moved a little more to the left, as viewed in FIG. 1, to make sure that the projection 9 cannot interfere with forward or backward movement of the tray 4 in order to place another slide 6 into transfer position. Switching means for opening and closing the motor circuit in a manner described above are well (while from the art and do not form part of the present invention.

If a slide happens to jam, either in the tray 4 or during travel toward registry with the projection window 10, and if such slide then offers a predetermined resistance to movement with the carriage 7 *while the shifter pin 33 engages the leaf 35), the spring 39 yields and permits the leaf 35 to pivot on the pintle 43 so that the shifter pin 33 is free to continue its orbital movement about the crankshaft 31 but without moving the carriage 7 toward the right-hand end position. The carriage 7 remains at a standstill, either in the left-hand end position or in an intermediate position.

When the pin 33 thereupon engages the edge face 34, it can push the carriage 7 (which is assumed to dwell in an intermediate position) with a much greater force because the coupling including the parts 35, 39 is then ineffective and because the force required to permit rotation of the worm wheel 26 with reference to the flange 28a is much greater than the force required to expand the spring 39. During such return movement of the carriage 7 toward the end position of FIG. 1, the portion 21 of the upper arm of the lever 19 bears against the adjoining vertical edge of the frame of the slide which was stuck between its transfer and projection positions whereby the spring 20 yields and permits the upper arm of the lever 19 to bear against a rigid pin-shaped back support 44 on the main body portion of the carriage. This insures that the lever 19 cannot turn further in a clockwise direction and that the portion 21 pushes the slide back toward its compartment in the tray 4. In many instances, the frame of a slide jams in the grooves 16a, 17a of the guiderails 16, 17. The spring 27 is preferably designed in such a way that it insures return movement of such a slide into the tray 4.

The magnitude of force which can be transmitted by the coupling including the coupling elements 35, 39 can be adjusted by replacing the spring 39 with a stronger or weaker spring. The magnitude of torque transmitted by the friction coupling 26, 27, 28a can be changed in a number of ways, for example by replacing the spring 27 with a different spring or by changing the bias of the spring 27. When the slide projector is in use, the magnitude of forces with which the carriage 7 is moved toward and away from the position shown in FIG. 1 is constant. This is in contrast with certain presently known slide projectors wherein the carriage is reciprocated by a composite primer mover which includes a spring whose bias changes continuously in response to displacement of the carriage.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended.

1. In a slide projector, a combination comprising a support; a supply of slides carried by said support, each of said slides being movable to a predetermined transfer position; and slide changer means carried by said support and including a slide engaging device movable from a first position in which it is ready to engage a slide in said transfer position to a second position to thereby normally move a slide from said transfer position to a projection position, said slide engaging device being further movable from said second to said first position to thereby normally return a slide from said projection position to said transfer position, a prime mover, and a motion transmitting connection between said slide engaging device and said prime mover, said motion transmitting connection comprising means for transporting said slide engaging device from said second to said first position with a first force which is one of a first range of forces and for transporting said slide engaging device from said first to said second position with a second force which is one of a second range of forces, the upper limit of said second range of forces being below the upper limit of said second range of forces so that said slide engaging device comes to a halt when a slide offers to the movement of said slide engaging device to said second position a resistance which exceeds the upper limit of said second range of forces, said transporting means comprising a friction coupling which normally transmits motion during transport of said slide engaging device in either direction and a second coupling which normally transmits motion only when said slide engaging device is transported from said first to said second position, said second coupling comprising first and second coupling elements respectively connected with said friction coupling and with said slide engaging device so that said first coupling element normally engages with the second coupling element during movement of said slide engaging device from said first to said second position, one of said coupling elements being yieldable in response to a predetermined resistance offered by said slide engaging device to movement toward said second position.

2. A combination as defined in claim 1, wherein said second coupling is interposed between said slide engaging device and said friction coupling.

3. A combination as defined in claim 1, wherein said slide engaging device is reciprocable between said first and second positions thereof and comprises first and second arms respectively arranged to push slides from said transfer position to said projection position and vice versa in response to reciprocation of said slide engaging device between said first and second position, one of said arms being movably secured to the remainder of said slide engaging device.

4. A combination as defined in claim 1, wherein said slide engaging device comprises a carriage which is reciprocable between said first and second positions, said motion transmitting connection further comprising a crank arm which is rotated by said friction coupling and carries said first coupling element, said second coupling element constituting said yieldable coupling element and being pivotably mounted on said carriage.

5. A combination as defined in claim 4, wherein said second coupling further comprises resilient means for biasing said second coupling element into the path of movement of said first coupling element.

6. A combination as defined in claim 4, wherein said carriage comprises an elongated face which is engaged by said first coupling element during a portion of each revolution of said crank arm to thereby move said carriage from said second to said first position.

7. A combination as defined in claim 4, wherein said second coupling element constitutes one leaf of a hinge which is mounted on said carriage.

8. A combination as defined in claim 1, wherein said prime mover is an electric motor and said motion transmitting connection further comprises a reducing gear.

\* \* \* \* \*